US010313304B2

(12) United States Patent
Haak et al.

(10) Patent No.: US 10,313,304 B2
(45) Date of Patent: *Jun. 4, 2019

(54) SYSTEM FOR DEMAND-BASED REGULATION OF DYNAMICALLY IMPLEMENTED FIREWALL EXCEPTIONS

(71) Applicant: Panasonic Avionics Corporation, Lake Forest, CA (US)

(72) Inventors: James A. Haak, Medina, WA (US); Kwok Liang Poo, Lake Forest, CA (US)

(73) Assignee: PANASONIC AVIONICS CORPORATION, Lake Forest, CA (US)

( * ) Notice: Subject to any disclaimer, the term of this patent is extended or adjusted under 35 U.S.C. 154(b) by 409 days.

This patent is subject to a terminal disclaimer.

(21) Appl. No.: 15/071,975

(22) Filed: Mar. 16, 2016

(65) Prior Publication Data
US 2017/0126622 A1  May 4, 2017

Related U.S. Application Data

(63) Continuation-in-part of application No. 14/932,159, filed on Nov. 4, 2015.

(51) Int. Cl.
*G06F 21/00* (2013.01)
*H04L 29/06* (2006.01)
(Continued)

(52) U.S. Cl.
CPC ....... *H04L 63/0209* (2013.01); *H04B 7/1851* (2013.01); *H04L 63/0263* (2013.01);
(Continued)

(58) Field of Classification Search
CPC ............. H04L 63/0209; H04L 63/0263; H04L 63/102; H04W 12/08; H04W 84/12; H04B 7/1851

See application file for complete search history.

(56) References Cited

U.S. PATENT DOCUMENTS 8,353,006 B2   1/2013  Lynch et al.
9,014,663 B2   4/2015  Saker et al.
(Continued)

FOREIGN PATENT DOCUMENTS

EP    1017188 A2 *  7/2000  ......... H04B 7/18506
EP    2634743 A1    9/2013

OTHER PUBLICATIONS

Martin Strohmeier, Ivan Martinovic; "On Passive Data Link Layer Fingerprinting of Aircraft Transponders"; Oct. 2015; CPS-SPC '15: Proceedings of the First ACM Workshop on Cyber-Physical Systems-Security and/or PrivaCy; Publisher: ACM; pp. 1-9 (Year: 2015).*
(Continued)

*Primary Examiner* — Shewaye Gelagay
*Assistant Examiner* — Courtney D Fields
(74) *Attorney, Agent, or Firm* — Brian Furrer

(57) ABSTRACT

A system for regulating dynamic implementation of exceptions in an onboard network firewall includes a client application interface receptive to a data link request from a client device. An onboard connectivity manager includes a firewall interface connected to the onboard network firewall to request the exceptions in response to a connection authorization, a client presence manager receptive to the data link request relayed by the client application interface from the client device, and a network load manager in communication with the firewall interface and the client presence manager. A remote connectivity manager is connected to a remote application service and is in communication with the onboard connectivity manager. The network load manager generates the connection authorization to the firewall interface in response to the connection authorization request and an evaluation of one or more access grant conditions.

16 Claims, 8 Drawing Sheets

(51) Int. Cl.
    *H04B 7/185*     (2006.01)
    *H04W 12/08*    (2009.01)
    *H04W 84/12*    (2009.01)

(52) U.S. Cl.
    CPC ........... *H04L 63/102* (2013.01); *H04W 12/08*
                    (2013.01); *H04W 84/12* (2013.01)

(56) References Cited

U.S. PATENT DOCUMENTS

| | | | |
|---|---|---|---|
| 2007/0299789 A1 | 12/2007 | Young | |
| 2009/0282469 A1* | 11/2009 | Lynch | H04W 12/06 |
| | | | 726/11 |
| 2012/0290436 A1* | 11/2012 | Frost | G06Q 30/06 |
| | | | 705/26.41 |
| 2014/0053243 A1* | 2/2014 | Walsh | H04L 63/0236 |
| | | | 726/4 |
| 2014/0307847 A1 | 12/2014 | Neal | |

OTHER PUBLICATIONS

Wolfe, Bryan M., AT&T Prepping Plan to Let App Makers Pay for a Customer's Data Usage, Feb. 27, 2015, 2 pages, http://appadvice.com/appnn/2012/02/att-prepping-plan-to-let-app-makers-pay-for-a-customers-data-usage.

European Patent Office, European Search Report, dated Jul. 26, 2017, 8 pages, Munich, Germany.

\* cited by examiner

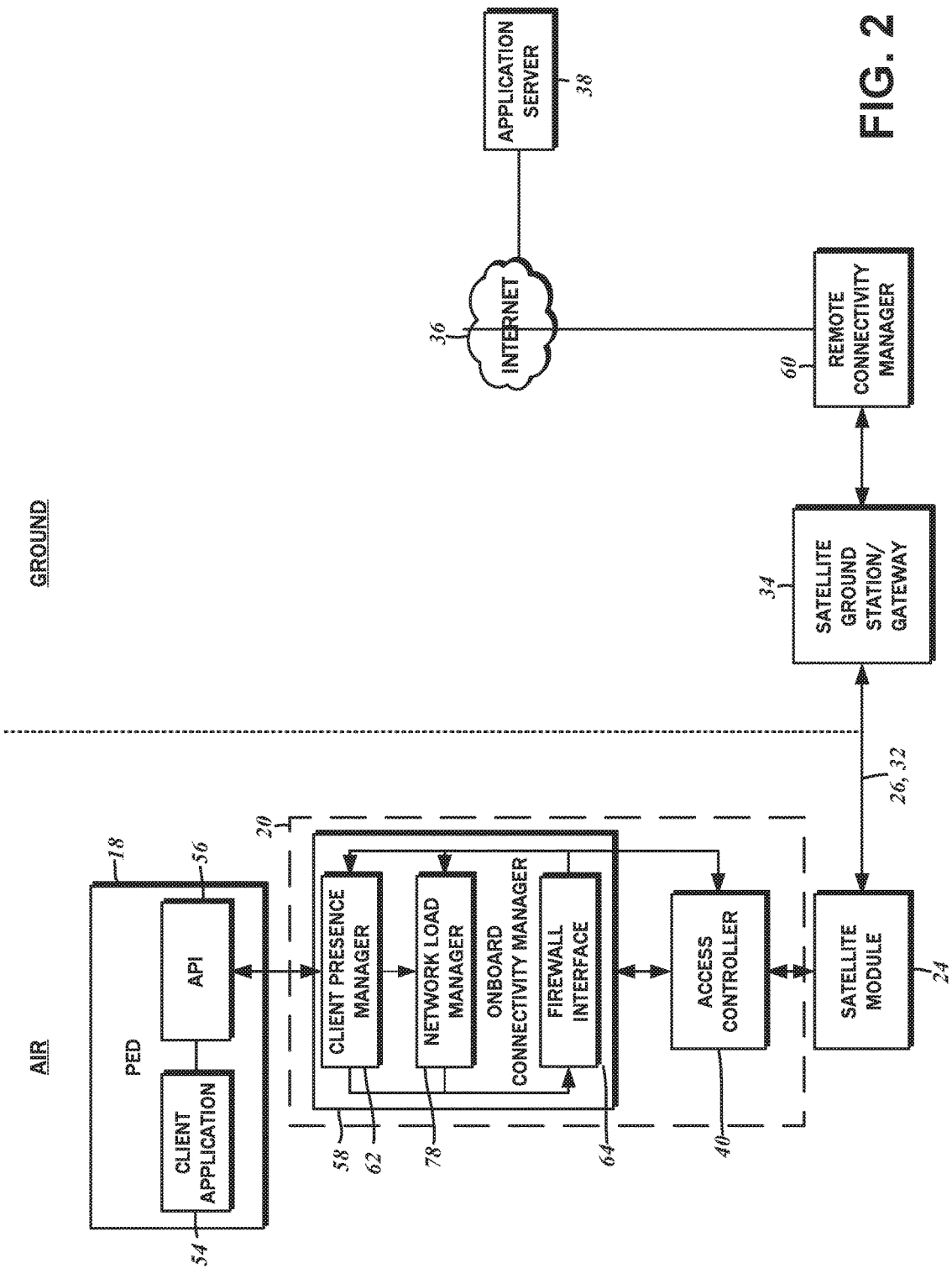

SYSTEM FOR DEMAND-BASED REGULATION OF DYNAMICALLY IMPLEMENTED FIREWALL EXCEPTIONS

CROSS-REFERENCE TO RELATED APPLICATIONS

This application is a continuation-in-part of U.S. patent application Ser. No. 14/932,159, filed Nov. 4, 2015 and entitled "SYSTEM FOR DYNAMICALLY IMPLEMENTING FIREWALL EXCEPTIONS," the entirety of the disclosure of which is incorporated by reference herein.

STATEMENT RE: FEDERALLY SPONSORED RESEARCH/DEVELOPMENT

Not Applicable

BACKGROUND

1. Technical Field

The present disclosure relates generally to data communications, and more particularly, to systems for demand-based regulation of dynamically implemented network firewall exceptions in providing data communications services on board aircraft and other vehicles.

2. Related Art

Air travel typically involves journeys over extended distances that at the very least take several hours to complete. Some of the longer non-stop international flights have scheduled durations of over sixteen hours with travel distances extending beyond ten thousand miles. Passengers on board the aircraft are confined within an enclosed space of a designated seat for the entire duration of the flight, with only a few limited opportunities to leave the seat for use of the lavatory and so forth. Thus, even on the shortest trips an airline passenger has some idle time, which the passenger may occupy with work, leisure, and/or rest.

Airlines thus provide on-board in-flight entertainment (IFE) systems that offer a wide variety of multimedia content for passenger enjoyment. Recently released movies are a popular viewing choice, as are television shows such as news programs, situation and stand-up comedies, documentaries, and so on. Useful information about the destination such as airport disembarking procedures, immigration and custom procedures and the like are also frequently presented. Audio-only programming is also available, typically comprised of playlists of songs fitting into a common theme or genre. Likewise, video-only content such as flight progress mapping, flight status displays, and so forth are available. Many in-flight entertainment systems also include video games that may be played by the passenger.

Although cabin-installed IFE systems remain a popular choice for passengers, an increasing number are choosing to bring on board their own portable electronic devices (PEDs) such as smart phones, media players, electronic readers, tablets, laptop computers, and so forth. These devices are typically loaded with music, video, games, and other multimedia content of the user's choosing, though during the flight, such devices mostly fill the same role as IFE systems—to keep the user entertained and otherwise occupied during the flight.

However, there is also a demand on the part of some passengers to put PEDs to more productive uses, which typically require access to the Internet. For instance, PEDs may have installed thereon various e-mail and instant messaging client applications, stock trading applications, banking applications, file sharing applications, cloud-based notetaking applications, and countless other productivity software. Furthermore, there may be dedicated applications that have functions that are particularly useful during travel, such as trip and connecting flight/departure gate tracking. Also popular are applications that are not necessarily productivity-related but still require Internet access, such as sports score updates, text-based news, and so forth.

Internet access on flights is typically provided via an onboard WiFi network, to which the PEDs connect. In this regard, there may be several WiFi access points located throughout the cabin, each of which are connected to a satellite uplink module that is in communication with a satellite. The satellite, in turn, may be in communication with a ground station that is connected to the Internet.

As the bandwidth of the satellite downlink is limited as it is costly to the airline, Internet connectivity may be provided only to paying customers. One model is a subscription-based model, where a flat fee is paid for monthly access periods. Such plans may be more suitable for frequent travelers. Alternatively, short term access on a per-flight, daily, hourly, or other time limited basis in exchange for the payment of a lower fee is possible, although typically at a higher monetary rate per unit of time.

In some IFE implementations, a PED can connect to the WiFi network without accessing the satellite-based Internet link. One application is the retrieval of multimedia content and related data (such as digital rights management keys needed for playback) from an onboard content server for consumption during flight via the PED. Along these lines, it may be necessary for the PED to access a login webpage on the local network, through which payment for the Internet access can be submitted, along with inputting an acceptance of the airline's and the datalink provider's terms and conditions, and so on, prior to being permitted access to the Internet.

Accordingly, the WiFi access point may cooperate with a firewall that selectively restricts and permits access to the Internet from specific PEDs in accordance with the payment of the access/subscription fee. For instance, the firewall may begin a countdown timer for a particular PED to be allowed access to the Internet, e.g., data transmissions to and from the PED are permitted, for a predetermined duration, and upon expiration of the timer, preventing further data transmissions to and from the PED.

Presently, all of the aforementioned PED applications are developed around the assumption that Internet access is, or will be available, with the choice of how that access is to be obtained being left to the user and underlying service providers. When Internet access is unavailable, any functionality that involves updating or refreshing data ceases, with only the pre-stored data being presented. In order to maximize the value of purchasing Internet access for such a limited duration, customers would need to consider the other possible applications on the PED that would need such access, and balance the benefits of obtaining data or information therefrom with the access costs. Oftentimes this cost-benefit calculus results in the passenger simply not using these applications during flight, and relegating the PEDs to basic consumption devices for pre-stored content. Even at the lowest price points, passengers typically do not pay for connectivity unless reimbursement from employers and the like is possible.

From the perspective of the application providers, there may be a multitude of returns with every instance of application use, particularly with captive audiences such as passengers on an airline flight. For example, in a shopping application, each purchase may net the application provider a percentage of the sale price. A more indirect example is a connecting gate checking application, where being able to access status information on demand engenders confidence and loyalty to an extent where future, paid upgrades to the application are more likely to be purchased, and other such intangible returns.

The use of whitelists installed on the onboard firewall, with application providers paying a fee to be included thereon is one possibility for restricting Internet access to certain sites. However, there are several limitations with such an approach. Typical Internet services refer to secondary domains or Uniform Resource Locators (URLs) to provide content and/or services, and in turn, those secondary URLs may refer to further tertiary URLs. Maintaining such a whitelist is challenging, as the relationships between the primary URL and the secondary URLs, and the relationships between the secondary URLs and tertiary URLs constantly evolve, and must be recorded in the whitelist. From the discovery of broken URLs, suggesting updates, and applying those updates to the whitelists is a cumbersome multi-step process. Generally, whitelist implementations have significant runaway cost risk, particularly over many flights and many use cases. Billing application service providers on a per-application basis may not be possible, because tracking traffic to secondary URLs shared by several applications may not be possible.

Accordingly, there is a need in the art for extending the use of Internet-based applications on PEDs on flights that do not depend on the passenger or customer purchasing Internet access. There is also a need in the art for improved application-specific control over onboard firewalls instead of broad and imprecise access definitions such as whitelists that are difficult to maintain. Additionally, there is a need in the art for Internet access providers to exercise final authority over the application-specific control of onboard firewalls so as to not degrade connectivity for paying customers while also increasing allocation to encourage higher usage during off-peak times.

BRIEF SUMMARY

The present disclosure is directed to enabling any Internet-based application installed on PEDs to selectively activate in-flight Internet connectivity, and offloading costs to the application provider instead of requiring the passenger to purchase access. The activation of the Internet connectivity is further regulated in accordance with network capacity, among other factors. According to various embodiments, the application provider makes a real-time decision to open the onboard firewall, and excludes the passenger from the decision-making to purchase Internet access. It is expressly contemplated that the passenger need not be alerted to the bandwidth/access costs. Thus, the application provider can selectively enable Internet traffic to and from the aircraft, for which they are willing to pay, provided that there is sufficient availability without degrading service to subscribing users. Additionally, during periods of reduced usage, samples of Internet access may be freely provided.

One embodiment of the present disclosure is a system for dynamically implementing exceptions in an onboard network and/or ground network firewall(s) for one or more client devices on a data communications network on an aircraft to connect to a remote network node over a satellite communications link. The connections are partially authorized by a remote application service. There may be a client application interface that is receptive to a data link request from the one or more client devices. Additionally, there may be an onboard connectivity manager that may include a firewall interface, a client presence manager, and a network load manager. The firewall interface may be connected to the onboard network firewall to request the exceptions upon sensing application traffic from the client device. A presence state for the one or more client devices may be activated and maintained following the data link request. The system may further include a remote connectivity manager that is connected to the remote application service and in communication with the onboard connectivity manager. The remote connectivity manager can generate the connection authorization request based upon an evaluation of the presence state for the one or more client devices against one or more conditions set by the remote application service. The network load manager generates the connection authorization to the firewall interface in response to receipt of the connection authorization request from the remote connectivity manager and an evaluation of one or more access grant conditions.

In another embodiment, API integration between the client and client presence manager may not be necessary. The application provider may selectively authorize connectivity to its Internet presence from all client devices onboard a specific flight during a specific window thereof. The connectivity manager may enable connectivity to specific applications that may be unmodified and are commercial, off-the-shelf (COTS). Instead of the passenger invoking an application to trigger the logic to enable Internet connectivity, the onboard system may utilize a Bluetooth Low Energy (BLE) beacon notification in order to proactively alert client devices as to the availability of Internet connectivity, as authorized.

Another embodiment of the present disclosure is a system for auctioning connectivity rights to the highest bidder within a group of application providers. In this embodiment the application providers not only reimburse the airline for satellite communication bandwidth consumption costs incurred during the passenger's use of their application, but they also pay the airline a fee for the privilege to enable those passengers' use of their application.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 2 is a block diagram of the various components of an API based system for dynamically implementing firewall exceptions;

DETAILED DESCRIPTION

The detailed description set forth below in connection with the appended drawings is intended as a description of the several presently contemplated embodiments of a system for dynamically implementing firewall restrictions. This description is not intended to represent the only form in which the embodiments of the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
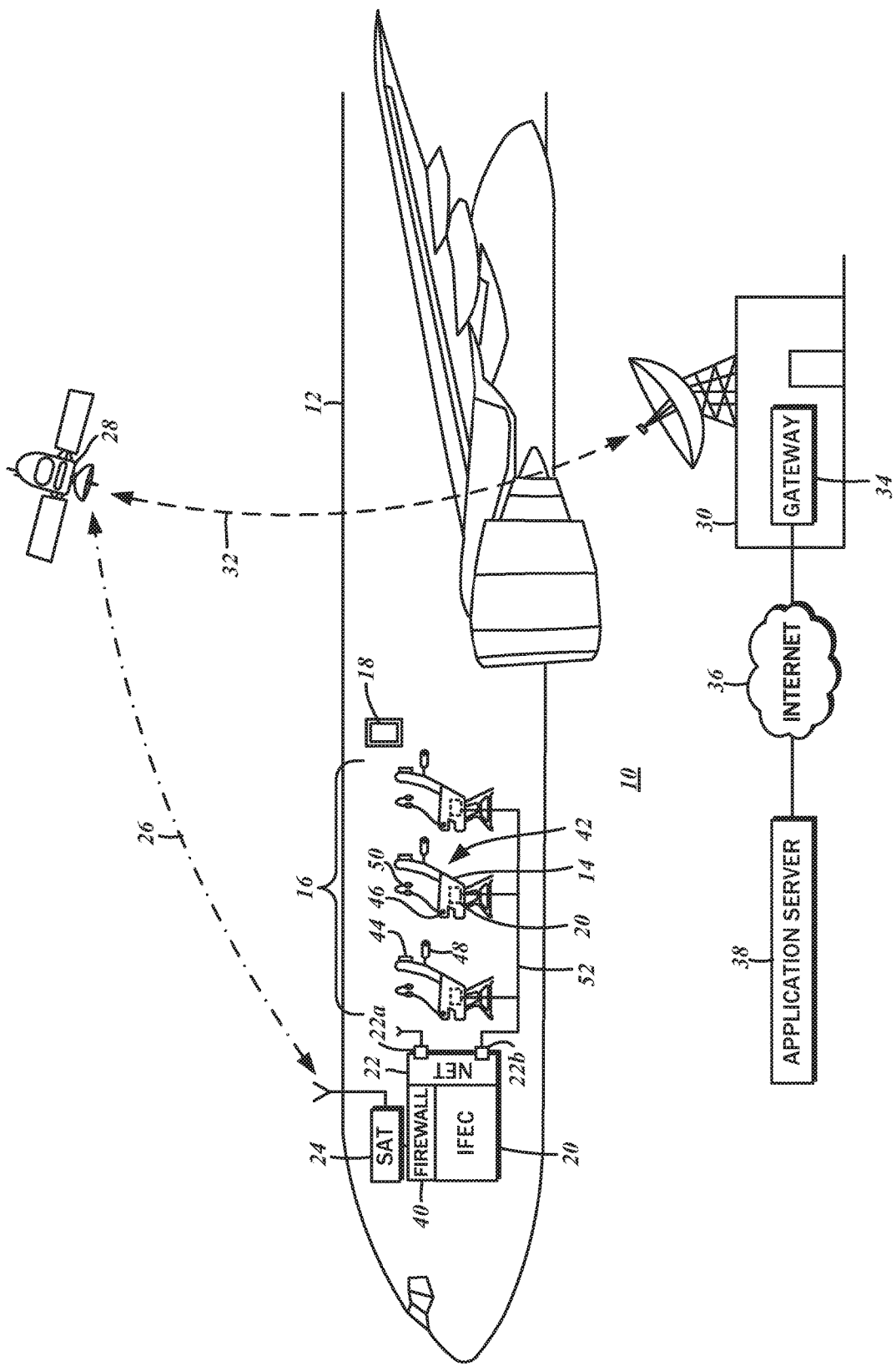
FIG. 1 is a diagram illustrating an environment in which the present system for dynamically implementing firewall exceptions may be deployed in accordance with various embodiments.

FIG. 1 is a simplified diagram of an aircraft 10, generally referred to herein as a vehicle, along with select subsystems and components thereof that are utilized in connection with the embodiments of the present disclosure. Within a fuselage 12 of the aircraft 10, there may be seats 14 arranged over multiple rows 16, with each seat 14 accommodating a single passenger. Although the features of the present disclosure will be described in the context of the aircraft 10 this is by way of example only and not of limitation. The presently disclosed system for dynamically implementing firewall exceptions may be utilized in any other context as appropriate.

One or more passengers may utilize a portable electronic device (PED) 18 during flight. The present disclosure generally contemplates, in accordance with one embodiment, the use of such PEDs 18 in a manner to which the user is accustomed while on the ground, e.g., with data connectivity. For purposes of the present disclosure, PEDs 18 refer to smart phones, tablet computers, laptop computers, and other like devices that include a general purpose data processor that executes pre-programmed instructions to generate various outputs on a display, with inputs controlling the execution of the instructions. Although these devices are most often brought on board the aircraft 10 by the passengers themselves, carriers may also offer them to the passengers for temporary use.

The aircraft 10 incorporates an in-flight entertainment and communications (IFEC) system 20 that, among other functions, provides such connectivity. In further detail, the IFEC system 20 includes a data communications module 22. Almost all conventional PEDs 18 have a WLAN (WiFi) module, so the data communications module 22 of the IFEC system 20 includes a WLAN access point 22a. The PED 18, via the onboard WLAN network, may connect to the IFEC system 20 to access various services offered thereon such as content downloading/viewing, shopping, and so forth.

The IFEC system 20 may also offer Internet access to the connecting PEDs 18. One contemplated modality that operates with the IFEC system 20 is a satellite module 24 that establishes a data uplink 26 to a communications satellite 28. According to one exemplary embodiment, the data uplink 26 may be Ku-band microwave transmissions. However, any suitable communications satellite 28, such as Inmarsat or Iridium may also be utilized without departing from the present disclosure. The data transmitted to the communications satellite 28 is relayed to a satellite communications service provider 30. A data downlink 32 is established between the communications satellite 28 and the satellite communications service provider 30 that, in turn, includes a network gateway 34 with a connection to the Internet 36. As will be recognized by those having ordinary skill in the art, there are numerous servers that are accessible via the Internet 36, though in the various embodiments of the present disclosure, the PED 18 connects to a particular application server 38 to access services thereon. In another embodiment, the aircraft 10 can be equipped with a cellular modem instead of, or in addition to the satellite module 24 for remote connectivity.

The PED 18 is understood to connect to the IFEC system 20 via the WLAN access point 22a, which relays the data transmissions to the satellite module 24. The data is transmitted to the communications satellite 28 over the data uplink 26, and the satellite relays the data to the satellite communications service provider 30 over the data downlink 32. The network gateway 34 then routes the transmission to the Internet 36, and eventually to the application server 38. Data transmissions from the application server 38 to the PED 18 are understood to follow a reverse course. Due to the high costs associated with the communications satellite 28 that is passed to the users of the data uplink 26 and the data downlink 32, the airlines may limit data traffic to and from the satellite module 24 with a firewall 40.

It is understood that the firewall 40 may be any conventional network appliance that includes a downstream network connection to the data communications module 22 that establishes the onboard local area network, as well as an upstream network connection to the satellite module 24. The firewall 40 may selectively block or permit specific devices connecting thereto via the onboard local area network from accessing the upstream network connection, e.g., the satellite module 24 depending on certain administratively defined conditions. For example, a rule/exception may be set for allowing traffic between a particular PED 18 that has paid a subscription fee, while restricting other PEDs 18 that have not subscribed. Furthermore, certain network node destinations may be blocked as inappropriate to access on a public network. These rules/exceptions may be activated for a set duration, such as, for example, when the user purchases an hour of access, access for the entirety of the flight, and so forth. Those having ordinary skill in the art will recognize that numerous other rules/exceptions for upstream data traffic may be set by defining such rules/exceptions in accordance with the syntax specific to the firewall 40. In this regard, although the syntax may differ depending on the specific implementation of the firewall 40, the logic of the rules/exceptions are understood to be applicable regardless of implementation. Therefore, to the extent such rules/exceptions are described in accordance with syntax specific to a given firewall 40, it is to be understood that this is by way of example only and not of limitation.

Another possible way in which the passenger can utilize the services offered through the IFEC system 20 are the individual seat-back modules that are typically comprised of a terminal unit 42, a display 44, an audio output 46, and a remote controller 48. For a given row 16 of seats 14, the terminal unit 42 and the audio output 46 are disposed on the seat 14 for which it is provided, but the display 44 and the remote controller 48 may be disposed on the row 16 in front of the seat 14 to which it is provided. That is, the display 44 and the remote controller 48 are installed on the seatback of the row in front of the seat. This is by way of example only, and other display 44 and remote controller 48 mounting and access configurations such as a retractable arm or the like mounted to an armrest of the seat 14 or by mounting on a bulkhead.

The display 44 is understood to be a conventional liquid crystal display (LCD) screen or other type with a low profile that is suitable for installation on the seatback. Each passenger can utilize an individual headset 50, supplied by either the airline or by the passenger, which provides a more private listening experience. In the illustrated embodiment, the audio output 46 is a headphone jack that is a standard ring/tip/sleeve socket. The headphone jack may be disposed in proximity to the display 44 or on the armrest of the seat 14 as shown. The headphone jack may be an active type with noise canceling and including two or three sockets or a standard audio output without noise canceling. In alternate embodiments, each display 44 may incorporate a terminal unit 42 to form a display unit referred to in the art as a smart monitor.

A common use for the terminal unit 42 installed on the aircraft is the playback of various multimedia content. The terminal unit 42 may be implemented with a general-purpose data processor that decodes the data files corresponding to the multimedia content and generates video and audio signals for the display 44 and the audio output 46, respectively. The multimedia content data files may be stored in one or more repositories associated with the IFEC system 20, and each of the terminal units 42 for each seat 14 may be connected thereto over a wired local area network 52, which may preferably be Ethernet. In addition to the aforementioned data communications module 22 that includes the access point for PEDs 18, there is an Ethernet data communications module 22b. More particularly, the Ethernet data communications module 22b is understood to be an Ethernet switch or a router.

Under the most common usage scenarios, the terminal units 42 initiate a request for multimedia content to the IFEC system 20, where such content is stored. The data is transmitted to requesting terminal unit 42 over the wired local area network 52, and most data traffic thus remains local. However, there are several additional applications contemplated that may rely upon a connection to the Internet 36, in which case the data is passed to the satellite module 24 so long as permission has been granted therefor by the firewall 40 in the same manner as described above in relation to the WLAN network and the request originating from the PED 18. The present disclosure, which is in part directed to implementing rules/exceptions of the firewall 40, is understood to be suitable for regulating data traffic from the aircraft-installed terminal units 42 in addition to the PEDs 18 as noted earlier.

With reference to the block diagram of FIG. 2, according to various embodiments, one or more client applications 54 are installed on the PED 18. In the context of the present disclosure, the presentation of information or other interactivity to the user of the PED 18 by way of the client application 54 is understood to involve the retrieval of data from a remote source such as the application server 38 that is connected to the Internet 36.

Rather than the user of the PED 18 paying for the privilege to access the upstream network connection, e.g., the satellite module 24, the application server 38 may instead offer to subsidize the costs of the satellite Internet connection so that the client application 54 may be utilized in the intended manner. The conditions under which the user of the PED 18 is permitted to access the satellite module 24 to transact with the application server 38 or any other node external to the onboard network may be set by the application server 38, and the authorization to allow the data traffic to and from the PED 18 is understood to originate from the same. The authorization procedure may remain hidden from the user of the PED 18, in that the user is not prompted with requests to allow charges for the access, or even made aware that there may be a cost associated with access. Thus, it is envisioned that the client application 54 functions seamlessly between inflight Internet connections and conventional Internet connectivity available on the ground, such as public/private/commercial WiFi networks, cellular networks, and so on.

Figure 3A:
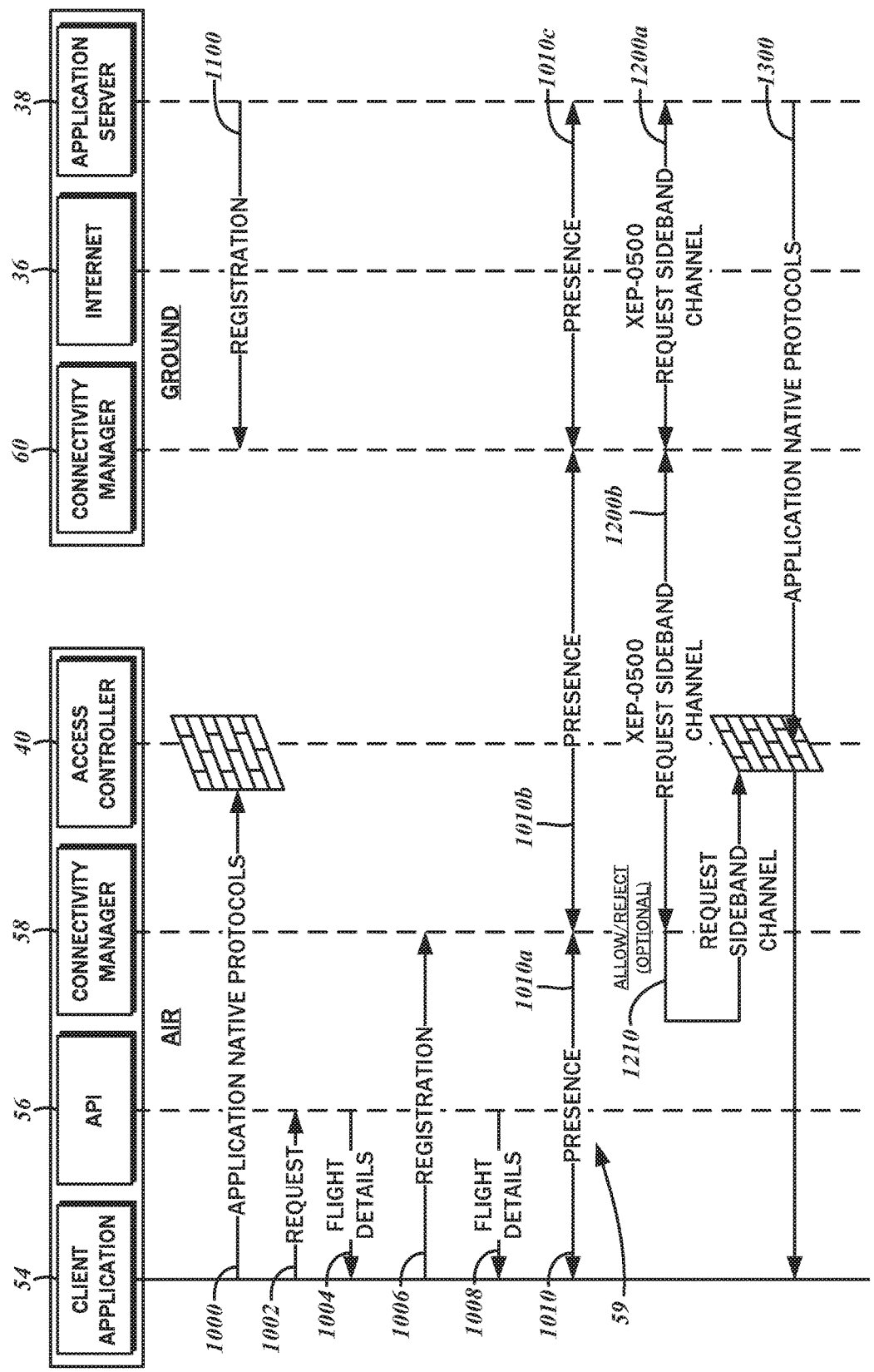
FIG. 3A is a data communications sequence diagram showing the pertinent components of the API based system along with typical data transmission interactions between such components.

When the typical client application 54 attempts to perform a function that requires connecting to a remote service such as the application server 38, a lower level data communications protocol stack that is part of the PED 18 is called, and the details of establishing the link may be abstracted out with respect to the main functions of the client application 54. When the protocol stack attempts to establish the link over the onboard network, however, the aforementioned firewall 40, also referred to herein more generally as an access controller, may limit such a connection attempt, either as exceeding the authorization for that particular PED 18, or as a non-existent upstream network node (or both). In this regard, as shown in FIG. 3A, a step in securing an authorization to open the data uplink 26 to the particular PED 18 may begin with the client application 54 making the request with its native protocols, per a sequence step 1000.

The PED 18 also has installed thereon a connectivity application programming interface (API) 56 that may be called by the client application 54 in an attempt to establish an alternative network connection to the Internet 36, and specifically to the application server 38. This may take place in a sequence step 1002, where the request is generated by the client application 54 to the API 56. In response, in a sequence step 1004, the API 56 may report back details pertaining to the current flight. This includes such information as the airline on which the user of the PED 18 is currently flying, the flight number of the flight on which the user of the PED 18 is currently flying, the destination of such flight, the origin/departure point of such flight, the anticipated arrival time of such flight, and the departure time of such flight. Additionally, the satellite uplink connectivity status may be reported, as well as the current beam load of the data uplink 26 and/or the data downlink 32. With the returned flight detail data, the client application 54, either directly or through the API 56, completes a registration process with an onboard connectivity manager 58 in accordance with a sequence step 1006. By this registration process, the assigned Internet Protocol address, and other details pertaining to the PED 18 may be recorded.

Periodically, throughout the flight, the API 56 may update the flight detail data per sequence step 1008. The client application 54 remains in communication with the onboard connectivity manager 58 to provide a presence state 59 with respect to the PED 18. The presence state 59 is understood to encompass the aforementioned flight detail data, as well as other data that pertains to the user or the PED 18, such as the onboard network address assignment. In one embodiment, the presence state 59 may be shared with the eXtensible Messaging and Presence Protocol (XMPP). As indicated above, it is possible for the passenger to prepay for Internet connectivity, and because it will not be necessary for the application server 38 to specifically authorize the firewall 40 to permit access to the satellite module 24, the presence state 59 may also include subscriber status data.

The presence state 59 of the PED 18 is transmitted from the client application 54, either directly or through the API 56, to the onboard connectivity manager 58 in a sequence step 1010a. From the onboard connectivity manager 58, other presence states of the PEDs 18 also on the aircraft local network are aggregated, and transmitted to a remote connectivity manager 60 in a sequence step 1010b. Because the costs for transmitting the presence state 59 may not be assignable to a particular application server 38, it may be absorbed by the airline. The aggregation of multiple presence states in a single transmission is contemplated to minimize this cost burden.

The onboard connectivity manager 58 is generally comprised of a client presence manager 62, and the foregoing functionality of maintaining, aggregating, and transmitting the presence state 59 is understood to be performed thereby. Additionally, the onboard connectivity manager 58 includes a firewall interface 64, the details of which will be described more fully below. As referenced herein, the client presence manager 62 and the firewall interface 64 are understood to be implemented as persistently active software modules or components on the IFEC system 20 that accepts inputs, processes those inputs, and generates an output in response. Based on the functions described herein, those having ordinary skill in the art will recognize a variety of ways in which such software could be written. The logical segregation between the client presence manager 62 and the firewall interface 64 is presented by way of example only and not of limitation, and any other suitable separation of functions into different logical units may be utilized without departing from the present disclosure.

Upon storage of the presence states in the remote connectivity manager 60, the application server 38 has access thereto. Certain conditions set by the application server 38 are understood to govern the granting or denial of access to the satellite module 24 by the PED 18. In further detail, the identification of the airline in the presence state 59 may be used to determine if there are any promotions or agreements that govern the granting of Internet access. Furthermore, flight number, departure location, destination location may help the provider target specific demographics, or limit access to the application server 38 to certain locations. A phase of the flight (beginning, middle or end) may help focus the offerings that would be of most interest to passengers at such time. Along these lines, the remaining flight duration and the connectivity window may help determine whether or not granting access would be beneficial to the provider. For example, if average interaction periods with an application or service were fifteen minutes, but only five minutes remained before the start of landing procedures, paying for access to the Internet for the user to be engaged for that duration would not be worthwhile. The jurisdiction or country of the airspace in which the aircraft is flying may be useful to allow access to content or services that are legal therein. The number of other PEDs 18 on the onboard network may indicate the potential volume, and the listing of PEDs 18 with active Internet access subscriptions may indicate necessity. Furthermore, the beam load, i.e., the amount of traffic on the data uplink 26 and the data downlink 32 can alter the cost of access, so the application or service provider may consider the maximum cost that is intended to be subsidized.

In one example use case, a game development company that relies on in-app purchases may be open to paying connectivity costs so long as in the aggregate, it makes more from purchases than the losses associated with such costs. A similar application is an online gambling company that may be open to pay connectivity costs based upon the expectation that the user will lose more money gambling than the company loses with the costs.

The sponsor of the connectivity need not be limited to the destination application server 38. For example, an automobile company may sponsor a connection to an automobile review site on which the user may complete an advertising campaign action. In this manner, the embodiments of the present disclosure may be utilized for supporting various business relationships without involving complex integration of the carrier or the IFEC system 20 provider. In yet another example, a vehicles-for-hire service may sponsor a connection to an online marketplace for travel experiences, particularly for search results in the locale in which the vehicle was hired. The reverse may also be possible, where the travel experience marketplace site sponsors a connection to the vehicles-for-hire service when the user has purchased an experience.

The access grants/denials are understood to be implemented as exceptions to the general restrictions set on the firewall 40. In order for the application server 38 to grant or deny Internet access remotely in the manner contemplated, a registration procedure with the remote connectivity manager 60 is contemplated, in accordance with a sequence step 1100. The identity of the client application 54 that cooperates with the application server 38 is associated thereto, so that connection requests originating from the client application 54 can be directed to the particular application server 38 with which the client application 54 interacts.

The presence state 59 of the client application 54 relayed to the remote connectivity manager 60 is also transmitted to the application server 38 in accordance with a sequence step 1010c. The application server 38, in turn, evaluates the presence state 59 to determine whether the instance of the client application 54 running on a particular PED 18 to which the presence state 59 pertains, should be permitted access to the satellite module 24 in order to transact with the application server 38. It is understood that while the application server 38 may be in persistent contact with the remote connectivity manager 60 to evaluate each update to the presence state 59, this is optional. A definition of the conditions under which connectivity is to be granted may be pre-loaded on to the remote connectivity manager 60, so that the processing and communication burdens may be passed thereto.

The authorization to set the exception for the firewall 40 may originate from the application server 38 in accordance with a sequence step 1200a, and transmitted to the remote connectivity manager 60. According to one embodiment of the present disclosure, the authorization may be in the form of an XEM-0500 message that requests a sideband channel. This authorization is relayed by the remote connectivity manager 60 to the onboard connectivity manager 58 in accordance with a sequence step 1200b. The firewall interface 64 of the onboard connectivity manager 58 sets an exception on the access controller or firewall 40 that grants traffic to and from the designated client application 54/PED 18 to access the satellite module 24 for establishing a data communications link to the application server 38. The exception may be specified in terms of the permitted destination address and port of the application server 38 in the case of outgoing data, and the permitted source address and port of the application server 38 in the case of incoming data. Henceforth, all traffic between the client application 54 and the application server, per sequence step 1300, is understood to take place in accordance with the application native protocols. Because traffic is permitted on a per-user, per-application basis, allocating the cost of the satellite links to specific providers of the client application 54 and/or the application server 38 is possible.

Although in the illustrated example the authorization is to connect to the application server 38, this is by way of example only. The application server 38 may specify another server node instead, so that the firewall 40 limits the Internet connectivity for the client application 54 to connect to such alternative server. The presently contemplated system is understood to allow for the application and service providers to fine tune secondary and tertiary servers that are utilized for load balancing and other purposes. This is possible without reliance on whitelists and other broad-swath access definitions that are difficult to update and maintain. The flexibility of the system is envisioned to result in better service to the user, at a lower cost to the application and service providers.

The foregoing sequence illustrated in conjunction with FIG. 3A is understood to require a minimal amount of time. Preferably, the data exchange taking place from initial request to authorization takes place within a few seconds and in the background, so the user is unaware of the procedure described above. To the user, the use of the client application 54 appears no different than when connecting to a home WLAN network, or to a cellular network.

Figure 3B:
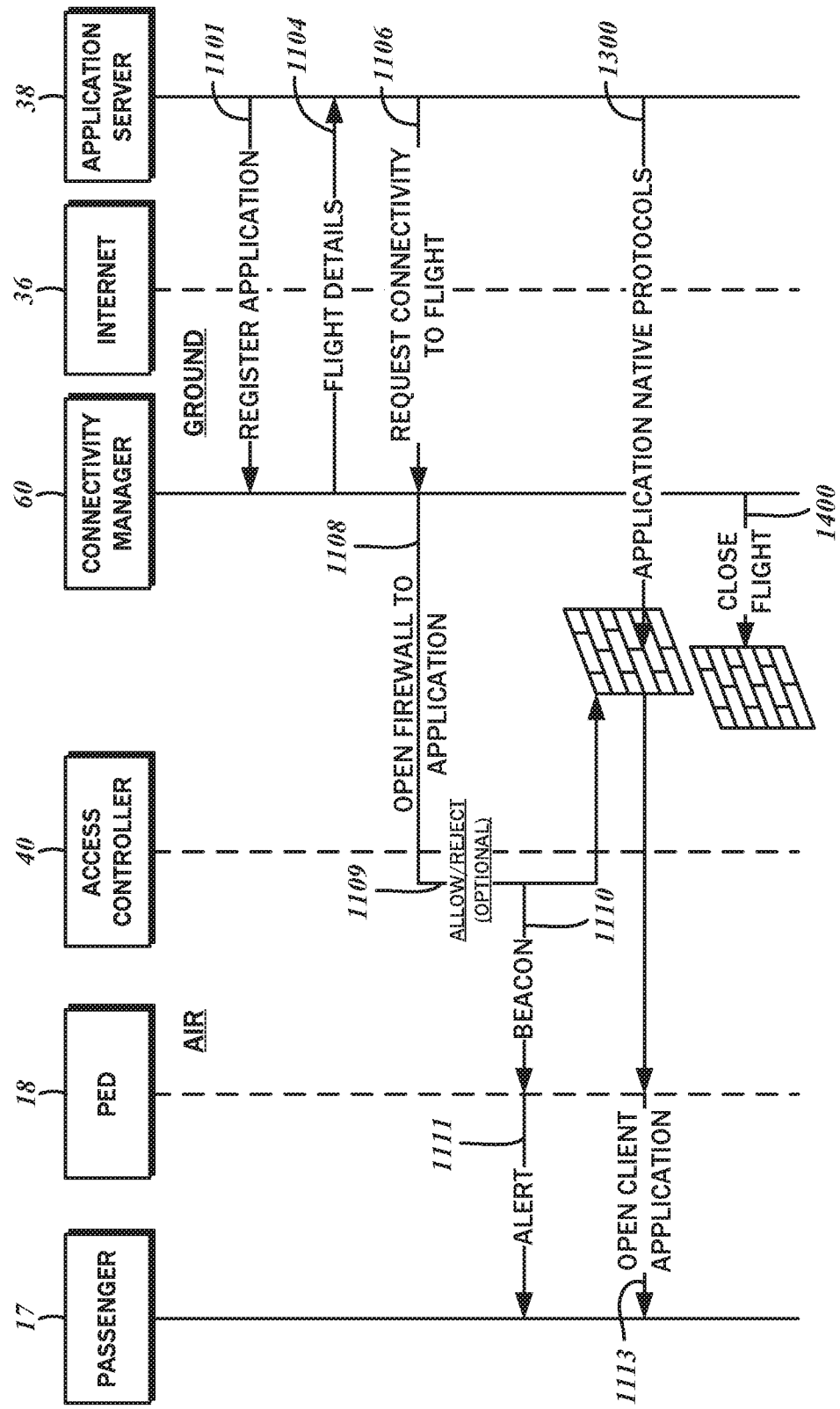
FIG. 3B is a data communications sequence diagram showing the interactions of a firewall system without need for client API integration.

FIG. 3B illustrates an alternative to the API-based system implementation described above. The application provider is provided with flight details of all aircraft within participating airline fleets as those flight events occur. Specifically, the connectivity manager 60 provides such flight details in accordance with a sequence step 1104. However, the application provider is not provided with presence attributes of individual PEDs 18. The application provider may request a firewall exception to any flight at any time during that flight in anticipation that one or more PEDs 18 may attempt to reach that application 54 at some point during that flight. This may take place in accordance with a sequence step 1106.

Instead of opening the firewall hole to precisely the right device at precisely the right time, this implementation opens the firewall hole to a large number of devices over a longer period of time. In further detail, the remote connectivity manager 60 communicates with the access controller 40 to make this request per sequence step 1108. Prior to the application provider/application server 54 being permitted to make such a request, the application provider may register its own URL and any supporting URLs as needed by the application with the remote connectivity manager 60 in accordance with a sequence step 1101. The client application 54 resident on the PED 18 is understood to operate in a manner consistent with terrestrial Internet connectivity, for example, as it would before and after the flight while traveling to/from the airport.

As shown in FIG. 3B, the system may alert the passenger 17 of the opportunity to utilize the application via a Beacon notification per sequence step 1110, which in turn provides an alert to the passenger 17 in accordance with a sequence step 1111. However, many passengers 17 may not have enabled their personal device to receive beacon notifications. Of course, the passenger 17 can choose to open the client application for any number of reasons, as depicted in a sequence step 1113. For example, the crew could make a PA announcement, or provide an advertisement within the IFE system. All traffic between the PED 18 and the application server 38, per sequence step 1300, is understood to take place in accordance with the application native protocols. At the end of the flight, the connectivity manager 60 may close the connection/flight in accordance with a sequence step 1400. The common thread in any implementation of this embodiment is that a higher uptake rate may be achieved by soliciting connections rather than only authorizing connections as they are attempted.

Figure 4A:
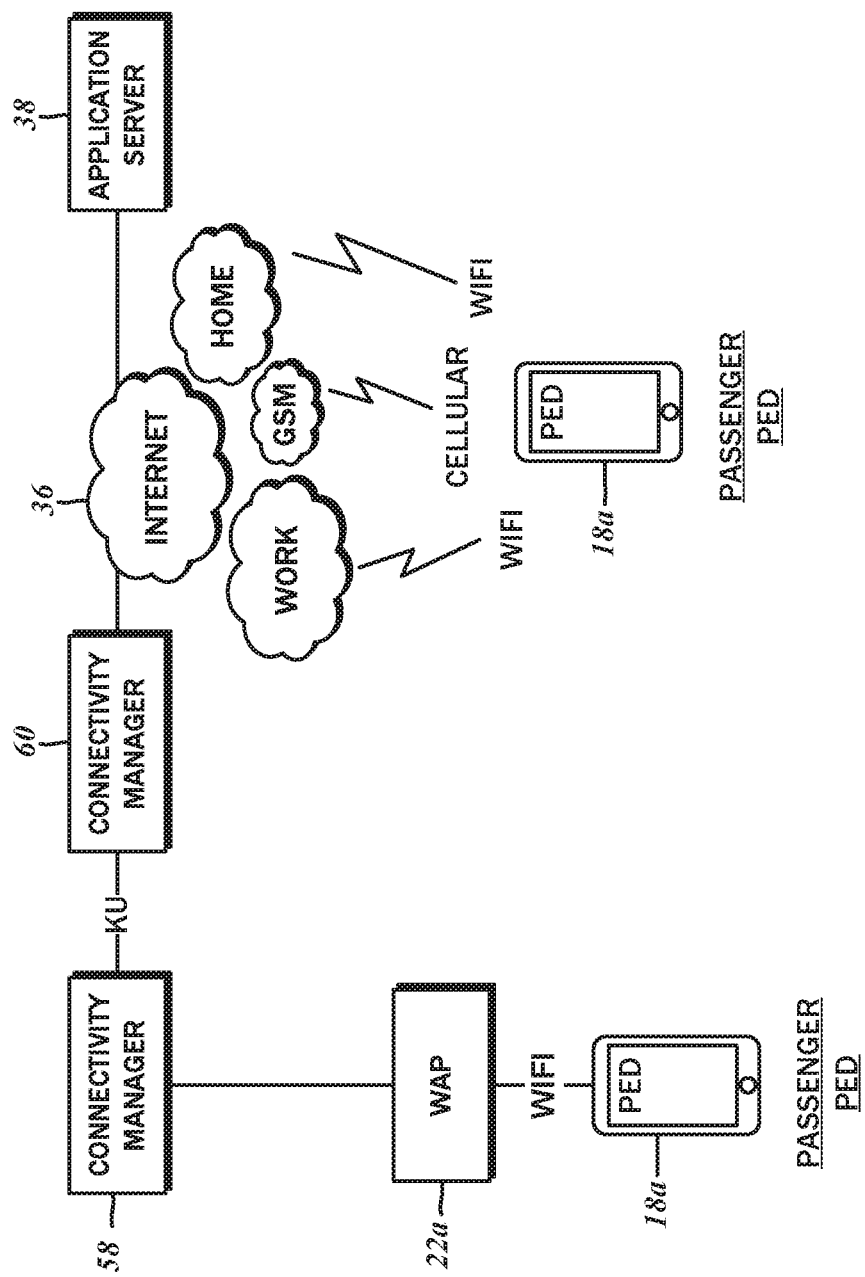
FIG. 4A is a block diagram showing an overview of an exemplary implementation of the system in which a passenger personal electronic device (PED) has seamless connectivity to the Internet across various networks.

Referring now to the block diagram of FIG. 4A, the passenger PED 18*a* connects to the onboard WLAN access point 22*a*, and accesses the Internet 36 via the onboard connectivity manager 58 and the remote connectivity manager 60. Additionally, when not onboard the aircraft 10, the user can access the Internet 36 by various conventional modalities, including a home network (which may also be a WiFi network), a work network, as well as a cellular (GSM) network. In accordance with various embodiments of the present disclosure, the transition between the Internet connection as authorized by the application server 38 as described above, and the conventional Internet connections may occur without user intervention, and without user notification.

Figure 4B:
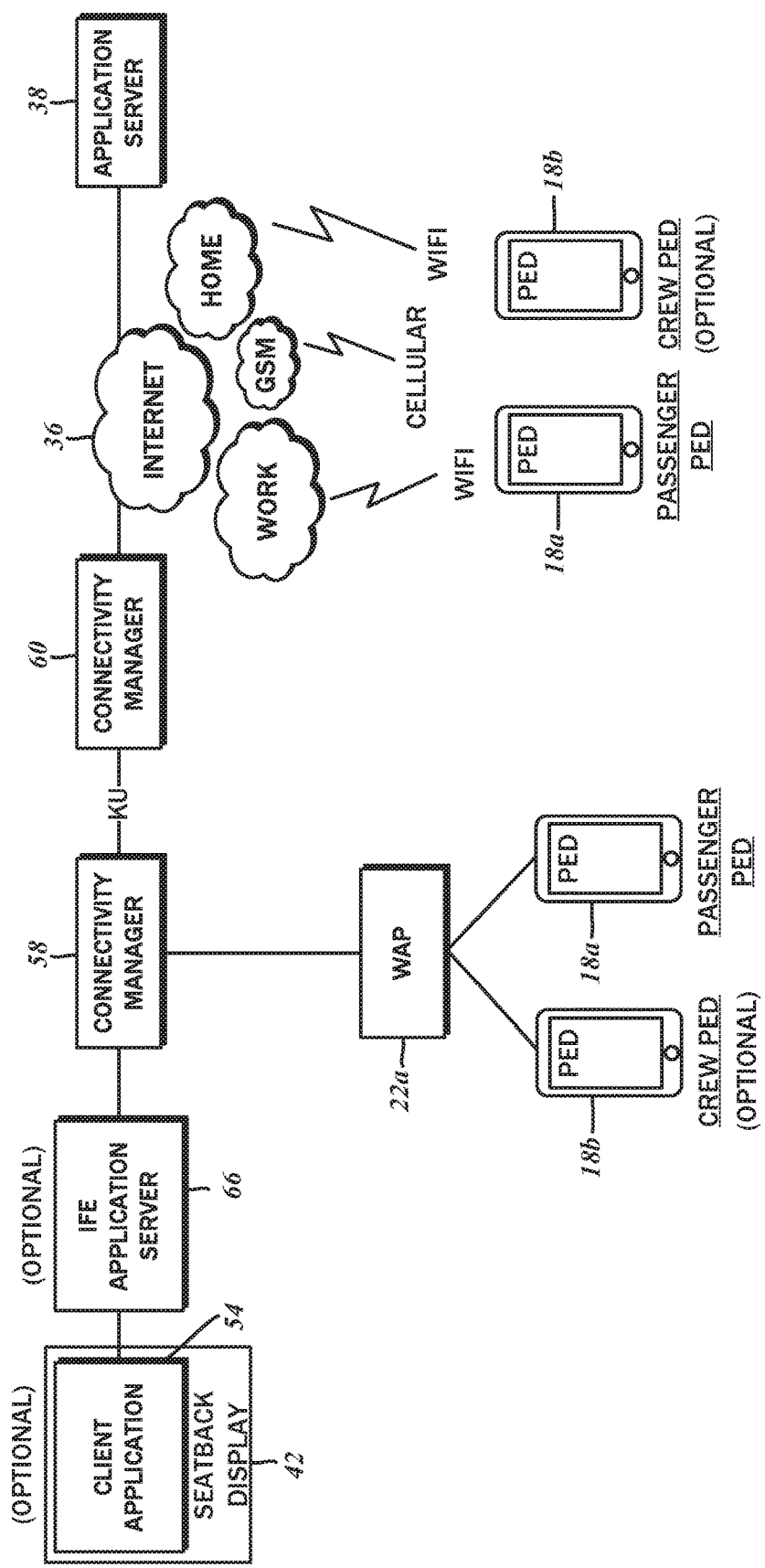
FIG. 4B is a block diagram showing another exemplary implementation of the system that further incorporates a seatback client.

The block diagram of FIG. 4B illustrates an alternative embodiment that incorporates an aircrew PED 18*b*, as well as an IFE terminal that can utilize the disclosed system for implementing firewall exceptions. The aircrew PED 18*b* is understood to function similarly to the above-described passenger PED 18*a*, in that while onboard the aircraft, a connection is made to the WLAN access point 22*a*. During flight, the aircrew PED 18*b* may likewise be authorized to connect to the Internet 36 via the onboard connectivity manager 58 and the remote connectivity manager 60. Similar to the passenger PED 18*a*, the aircrew PED 18*b* may also be connected to the Internet 36 via common access modalities such as work and home WLAN networks and GSM/cellular networks.

In addition to those uses that are common with the passenger PED 18*a*, the aircrew PED 18*b* may be utilized for crew messaging based on the Aircraft Communications Addressing and Reporting System (ACARS). The presence state 59 that is communicated from the onboard connectivity manager 58 to the remote connectivity manager 60 can include avionics data retrieved from the ARINC 429 bus, as one of the nodes connected thereto is the IFEC system 20. Furthermore, the presence state 59 may be provided to traditional ACARS ground destinations with conventional XMPP servers. The XMPP presence state 59 can carry text messages, so air and ground crew messaging, including all forms of ACARS messaging, can be supported.

The embodiment shown in FIG. 4B also contemplates the installation of the client application 54 on a seatback display, e.g., the terminal unit 42 of the IFEC system 20. In some cases, the client application 54 may be limited to communicating with local services such as an IFE application server 66, though it is also understood to be connectible to the application server 38 that is remote from the aircraft 10.

A wide variety of applications, including travel-oriented as well as more general ones, are envisioned to benefit from the provider authorized (and subsidized) Internet connectivity. One exemplary application particularly suitable for air travel is viewing connecting flight departure gate information during flight. This information may be presented via the IFEC system 20 on the seatback display 44, on a cabin overhead monitor, or on the PED 18. Beacons deployed within the airport may provide a further level of assistance by guiding the traveler to the desired gate. Obtaining connecting gate information on the PED 18 during flight is possible with the presently contemplated system, as the airline may authorize access to the data source therefor prior to arrival. Additionally, once the passenger has disembarked from the aircraft 10, the Internet connection may be transitioned to a local WLAN network accessible within the airport terminal.

Another air travel specific application is duty free sales. The user, via the PED 18 or the terminal unit 42 of the IFEC system 20, may browse a catalog of available items during flight. The receipts of any purchases may be downloaded to the PED 18 during flight from the application server 38 via the authorized satellite-based Internet connection, and the item may be picked up upon landing at the airport following a presentation of the receipt. The receipt may include a QR code or other machine-readable code that verifies the purchase and the customer. The customer may also change onboard pre-order while browsing in the airport. Meal ordering, ground bases concierge services integrated with onboard flight attendants are other possible applications with tie-ins to functionality that can be accessed via the terminal unit of the IFEC system 20.

The data transmitted to the PED 18 in all of these example uses are understood to be conveyed via XMPP presence states, though it is possible to use other protocols such as HTTP within a browser by requesting the opening of a sideband channel as described above. Generally, a closer relationship between the airline-controlled IFEC system 20 and the client application 54 that are related thereto encourages wider adoption, and more extensive usage of the subscription-based Internet connectivity services.

As noted earlier, applications that are not tied to travel may also utilize provider authorized Internet connectivity. One example is sports updates, and the text-based messaging system disclosed herein is understood to be particularly suitable for sending updates when a game score changes or a play period ends. While major events such as the Super Bowl or the World Cup are of wide interest, typically most users would have little interest in the more minor events. As such, newsfeeds of the top 10 or top 100 games would not be efficient, and would be cumbersome for the user to navigate to find the event of interest. Accordingly, various embodiments of the present disclosure contemplate a text messaging type alert that may be communicated through the updates to the presence states. Receiving such updates may be desirable for dedicated fans, as passengers are otherwise disconnected from the rest of the world during the flight.

Yet another exemplary application is stock trading, as traders cannot afford to be offline when the market is moving. Although dedicated day traders and the like may subscribe to an in-flight Internet access service, most passengers would not be engaged in stock trading during the flight. Thus, updates similar in form to the aforementioned sports score updates are contemplated, where text-based updates/alerts are generated for a select number of stocks of interest. This application is understood to require minimal bandwidth.

With the numerous possible client applications that may be incorporated with selective Internet connectivity according to the various embodiments of the present disclosure, the usage data associated therewith may be leveraged in further refinement to the targeting of potential customers. In general, passengers on a flight are understood to fit a particularly desirable subset of the consumer population, since such passengers share common attributes such as the means to afford a ticket, and known destination and/or departure point. As described above, the presence state 59 of the PED 18 is one basis for the application server 38 to decide whether or not to open the firewall 40 therefor. According to another aspect of the present disclosure, additional details pertaining to the passenger, using a specific application, with a specific history of interaction with preflight and inflight services may also serve as a basis for the decision.

Figure 5:
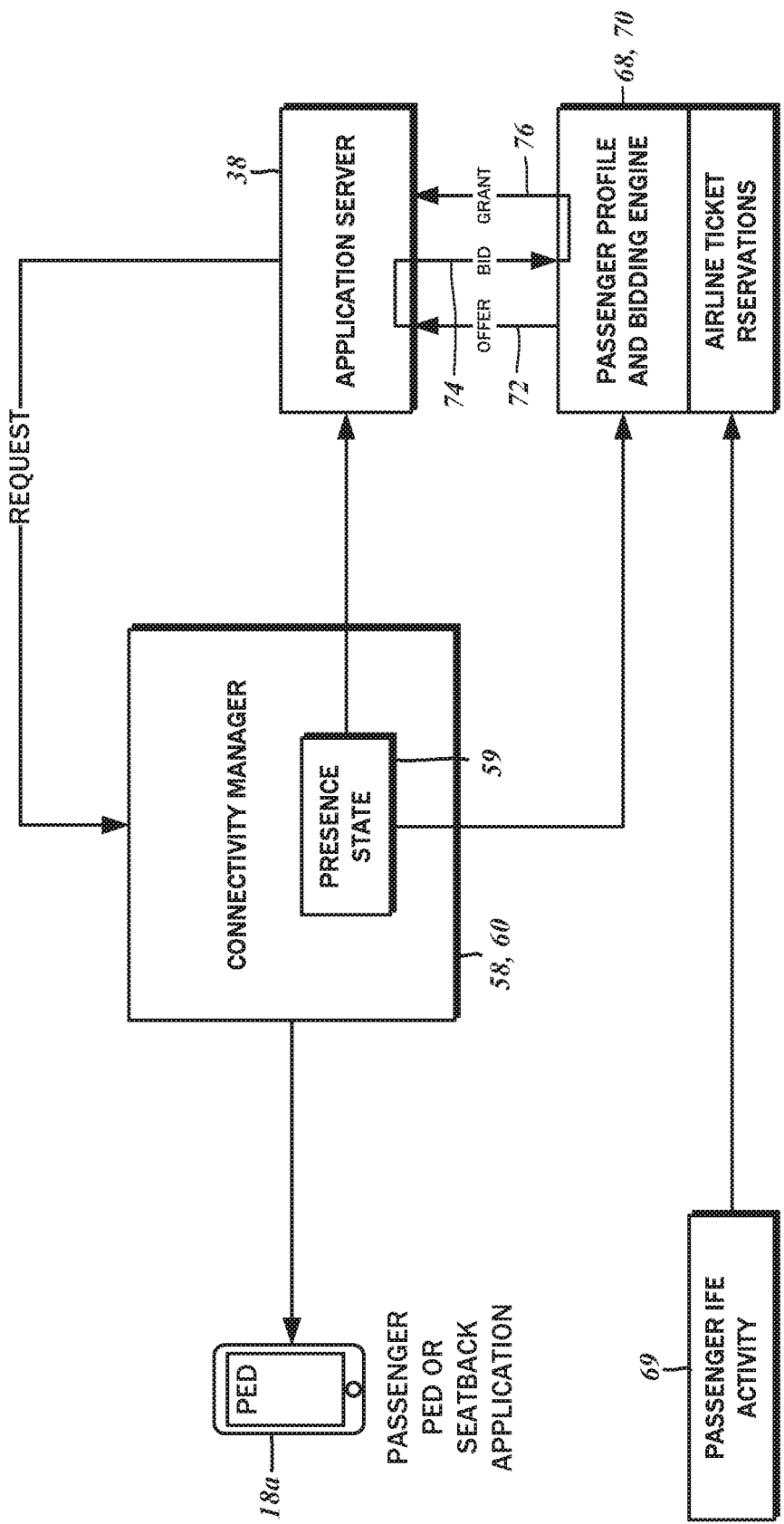
FIG. 5 is a block diagram of an embodiment of the system with an additional level of refinement with respect to allowing or denying access to an upstream network connection based upon passenger profiles and a bidding engine.
Figure 6:
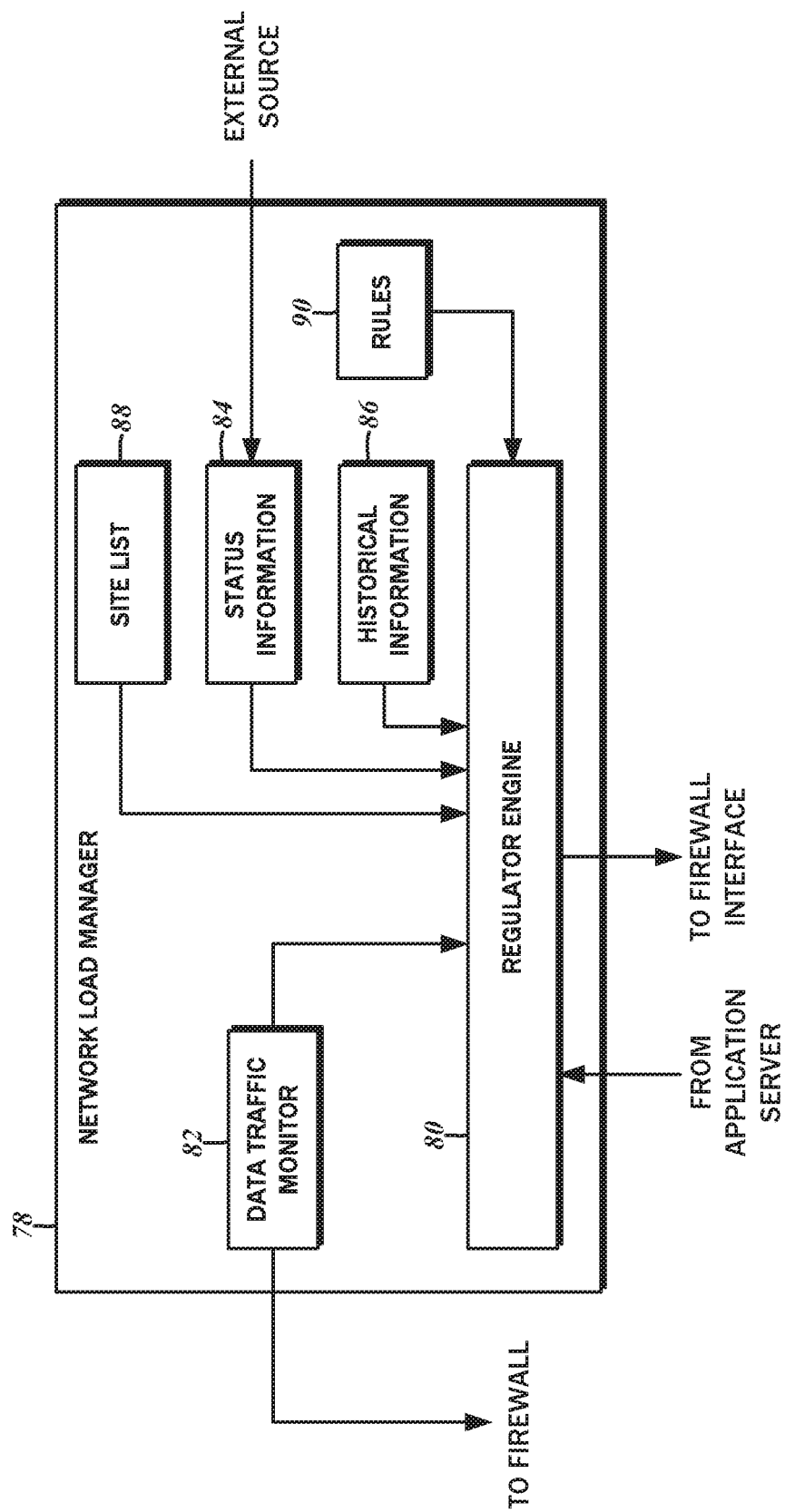
FIG. 6 is a block diagram of an exemplary network load manager in accordance with various embodiments of the present disclosure.

With reference to the block diagram of FIG. 5, again, the onboard and remote connectivity managers 58, 60, maintain the presence state 59 for the passenger PED 18a (which may also be the terminal unit 42 of the TEC system 20). The application server 38 may process the presence state 59 to determine whether the PED 18 is to be granted access to the onboard Internet connection, and provides an authorization depending on the outcome of that analysis. In addition to the presence state 59, however, the illustrated embodiment further contemplates a decision being made based on a passenger profile 68 associated with the PED 18.

By way of example only and not of limitation, the passenger profile 68 may include the home city, country, area code of the passenger. Additionally, the passenger profile 68 may include frequent flier status/category, connecting flights, and ticket reservations. The passenger's past interactions 69 with particular inflight services on current or past flights may be captured and maintained in the passenger profile 68. The level of detail of the passenger profile data depends on the specific needs of the airline, and may be varied.

In granting connectivity to the PED 18, the application server 38 may have access to the presence state 59 and the passenger profile 68, with the decision being made by the application server 38. However, if there are multiple parties that may be interested in offering connectivity in exchange for an opportunity to market to the passenger, a bidding engine 70 that allows the airline to consider multiple offers may be utilized. The bidding engine 70 is understood to have several operating modes, including restricting connectivity to the highest bidder, offering connectivity for a fixed price, and subsidizing connectivity. In each of these modes, the bidding engine 70 generates an offer 72 of the application server 38, and the application server 38 responds with a bid 74. The bidding engine 70 considers the bid 74, and grants 76 the bid to the winner. At this point, the application server 38 may be provided with the identity of the PED 18 requesting the connection.

An exemplary scenario that helps illustrate these operating modes is where the passenger profile 68 indicates a strong possibility of the passenger needing to book a hotel room at the destination of the flight. This may be based on recent IFEC system 20 and/or PED 18 activity history of the passenger viewing hotel-related content. In the operating mode in which the connectivity is restricted to the highest bidder, there may be multiple hotel booking sites (e.g., Hotels.com and Expedia.com). The offer 72 transmitted from the bidding engine 70 to the respective application servers 38 of these sites may indicate exclusivity that the highest bidder will be the only hotel booking site that will be allowed. In the bid 74, one site specifies $1, while the other site specifies $2. The bidding engine 70 receives these two bids, and provides the identity of the PED 18 requesting connectivity to the winning $2 bid in the grant 76.

It is understood that if the user was browsing the hotel booking sites via the web, there would be no notification thereto that an Internet connection was opened, particularly one that was paid for by a sponsor. In such case, the value of the exclusivity may be diminished, so web browsing is generally considered a low value application. It may be possible to highlight terms within the displayed content that pertain to the winning application server 38. If a hotel booking service client application were installed on the PED 18, it may be possible to generate an alert thereon that there is connectivity.

In the operating mode in which connectivity is offered for a fixed price, continuing with the example of the passenger profile 68 indicating a likelihood of the user needing to book a hotel, the bidding engine 70 may offer connectivity for ten cents each to a dozen hotel booking related sites. Another example is the bidding engine 70 offering connectivity to the passenger for $5 to a slot machine gambling provider. The bid 74 in the context of this operating mode and these examples are understood to be a positive acknowledgement by the application server 38 as to the proposed terms, after which point the identity of the PED 18 requesting connectivity is passed to the application server 38 by the bidding engine 70.

With respect to subsidizing the connectivity operating mode, there may be situations where the airline has reasons for preferring specific application servers 38. The offer 72 in such case is understood to be free of charge, and may include an indication of the entity paying for the Internet connectivity, which may be the airline, or the provider of the client application 54/application server 38.

The operating mode of the bidding engine 70 can be switched midflight, or may be changed dynamically based on an analysis of the available passenger profiles 68. With these operating modes, application providers may apply more complex business rules when responding to an opportunity to enable in-flight Internet connectivity to requesting PEDs 18 and IFEC system terminal units 42.

It is contemplated that in many use cases, the foregoing sponsored Internet access modality in which application providers vie for the opportunity to link passenger/users to their application server 38 represent substantial improvements over conventional whitelisting techniques, where traffic to approved sites are pre-authorized. However, the embodiments of the present disclosure may complement whitelisting. For instance, following an offer to sponsor Internet connectivity, once the benefits and receptiveness of the passenger audience become apparent, such application provider may then be solicited for a more formal arrangement in which the application server 38 is permanently whitelisted for any passenger at any time. Instead of making small and incremental, per-use or sponsorship payments, the application provider may pay a flat periodic fee.

In the embodiments of the onboard connectivity manager 58 and the various exemplary applications discussed above, the decision to grant access to the Internet 36 is primarily made by a sponsoring application provider. Thus, to the extent the application server 38 has manifested a willingness to so subsidize the costs of the satellite data uplink 26/downlink 32, the onboard connectivity manager 58 directs the firewall 40 to open a connection between the application server 38 and the PED 18. This may be disadvantageous in certain cases, particularly for the carrier and/or the satellite communications provider 30, as these additional connections may degrade the experience for the aforementioned paying customers. Along these lines, to the extent whitelisting is also utilized, the same concerns may apply, and possibly to a more significant degree, as whitelisted sites are accessible at all times.

Further alternative embodiments contemplate features directed to further regulation of implementing exceptions to the firewall 40. Specifically, the veto authority over the requested firewall exceptions from the application provider remains with the Internet service provider. Additionally, it is contemplated that the onboard connectivity manager 58 will also have the authority to reallocate satellite bandwidth according to current or anticipated demand, as well as provide samples of Internet access to passengers to encourage further use also based on demand. Access to the satellite links 26, 32 can be unilaterally filtered, and the sponsored traffic may be shaped as needed to ensure a quality connection for paying subscribers. Although some measure of control over satellite bandwidth usage is possible by influencing sponsorship demand to align within time windows of excess capacity, (e.g., dynamically discounted and/or premium rates). Restricting specific connections may be enabled during peak usage, or when excess capacity is below a predetermined minimum. It may be possible to limit sponsored traffic to a predetermined percentage of the overall data traffic, such as 10 percent, during peak usage.

During non-peak usage times, such traffic shaping is unlikely to degrade sponsored traffic because the satellite links 26, 32 have adequate bandwidth for paying subscribers as well as sponsored traffic, with no perceived reduction in speed. Traffic shaping and filtering may be concurrently utilized because filtering alone may not account for situations where actual demand exceeds anticipated demand.

Referring back to the block diagram of FIG. 2, in this alternative embodiment, the onboard connectivity manager 58 may further include a network load manager 78 that evaluates current network traffic load and other statuses/conditions, and selectively permits exceptions to be set on the access controller 40 via the firewall interface 64 depending on such evaluation. The network load manager 78 may include several other sub-components that may be implemented as a set of pre-programmed instructions executed by a data processor of the IFEC system 20.

In further detail, there may be a regulator engine 80 that accepts various data inputs in real-time, processes such data, and generates commands or instructions to the firewall interface 64 that pertain to whether upstream traffic to the satellite module 24 and beyond are to be allowed or refused. The regulator engine 80 accepts input from a data traffic monitor 82 that is in communication with the access controller 40, which, at the very least, reports on the current volume of data traffic being passed to the satellite module 24. Additional network status information such as available satellite bandwidth, current network speeds, and other suitable data points that may be utilized for data traffic shaping may also be reported. Higher level network status information such as the number of paying subscribers connecting to the Internet 36 via the satellite module 24 can be provided.

Other status information unrelated to the network may also be provided to the regulator engine 80 from an aircraft status module 84. This includes such information as time, IFE multimedia content update status, IFE or aircraft maintenance status, passenger status (e.g., the presence of VIPs, press flight, and so on). Historical network usage data 86 may also be provided to the regulator engine 80.

A set of predetermined rules 90 may be processed by the regulator engine 80 using the aforementioned data, including the current information provided by the data traffic monitor 82 and the aircraft status module 84, along with the historical network usage data 86, to respond to requests from the remote connectivity manager 60 to allow certain traffic to and from the application server 38. The first evaluation made by the regulator engine 80 is whether current data traffic conditions can support an additional sponsored connection without degrading the quality of existing data links. If it is determined that the satellite links 26, 32 have excess capacity, the rules 90 are processed in order to determine whether to allow or reject the firewall exception. For example, if the time is determined to be within a safe window when usage is traditionally low (e.g., 2:00 AM-4:00 AM local beam time), then the additional connection from the originating request may be authorized by generating a command to open the firewall 40 thereto.

In addition to sponsorship-based Internet connectivity, there are other embodiments in which free Internet access may be provided to users during times of low usage. The duration of the free access may be limited by the onboard connectivity manager 58 to just a few minutes so that passengers can sample the possible uses. The prioritization of this traffic, as well as the availability of the Internet connection to non-paying, non-sponsored users is understood to be processed in the same manner as the sponsored users.

Different weights may be assigned to different factors by the regulator engine 80 as determinations are made whether any particular request for a firewall exception is granted or rejected. Furthermore, where whitelisting is also utilized, sponsored traffic may be prioritized over whitelisted traffic, and vice versa. It will be appreciated by those having ordinary skill in the art that differing business considerations may necessitate one being prioritized over the other.

Similarly, different application servers 38 or Internet sites may be prioritized over others. For example, a text-based messaging service is likely to require substantially less bandwidth than a video streaming service. Accordingly, the regulator engine 80 may defer enabling streaming sponsorship to a safer window of time. The network load manager 78 may include a site list 88 of such application servers 38. The site list 88 may specify application servers 38 in a ranked order based upon potential impacts to bandwidth capacity, but it may also be based upon other factors defined by the carrier or the service provider. For instance, a restaurant booking service may be given higher priority than a travel booking service, as the carrier may have a greater number of restaurants advertising in its in-flight-magazine. In this example, it may further be the preference of the carrier to have passengers book through its own website, rather than through a third party travel booking service. The site list 88, and the prioritization thereof, may be kept private from the application providers. Another potential use for the site list 88 is to block certain sites during certain time windows, such as gambling sites while flying in the United States.

As indicated above, the data sequence diagram of FIG. 3A illustrates the embodiment in which the client application 54 first initiates the request to access the application server 38. In this embodiment, the aforementioned evaluation of whether or not to grant the firewall exception takes place in a step 1210, after the XEP-0500 request for the sideband channel is generated by the remote connectivity manager 60. In the alternative embodiment shown in the data sequence diagram of FIG. 3B, the PED 18 is alerted to the availability of the Internet connection once sponsorship is requested by the application server 38. The evaluation of whether or not to grant the firewall exception in this embodiment takes place in a step 1109, after the access controller 40 receives the request generated by the remote connectivity manager 60 in a step 1108.

The particulars shown herein are by way of example only for purposes of illustrative discussion, and are presented in the cause of providing what is believed to be the most useful and readily understood description of the principles and conceptual aspects of the various embodiments of the system for dynamically implementing firewall exceptions set forth in the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A system for regulating the dynamic implementation of exceptions in an onboard network firewall for one or more client devices on a data communications network aboard an aircraft to connect to a remote network node as authorized by a remote application service over a satellite communications link, the system comprising:
a client application interface receptive to a data link request from the one or more client devices;
an onboard connectivity manager including:
a processor; and
a memory storing instructions executed by the processor to implement software components including:
a firewall interface connected to the onboard network firewall to request the exceptions in response to a connection authorization;
a client presence manager receptive to the data link request relayed by the client application interface from the one or more client devices, a presence state for the one or more client devices being activated and maintained following the data link request; and
a network load manager in communication with the firewall interface and the client presence manager; and
a remote connectivity manager connected to the remote application service and in communication with the onboard connectivity manager;
wherein the remote connectivity manager generates a connection authorization request based upon an evaluation of flight details of the aircraft against one or more conditions set by the remote application service, the connection authorization request being generated in advance of any data link requests from the one or more client devices, the connection authorization request including a node identification corresponding to the remote network node with which a particular one of the one or more client devices is permitted to communicate over the satellite communications link;
wherein the network load manager generates the connection authorization to the firewall interface in response to receipt of the connection authorization request from the remote connectivity manager and an evaluation of one or more access grant conditions;
wherein the system further comprises an application installed on the client device that is operable to communicate with the remote application service, the node identification being specific to the application.

2. The system of claim 1, wherein the node identification includes a node address and a node port definition.

3. The system of claim 1, wherein the remote network node corresponds to the remote application service.

4. The system of claim 1, wherein the evaluation of access grant conditions is selected from a group consisting of: current network usage, current available bandwidth, and historical network usage.

5. The system of claim 1, wherein the onboard connectivity manager generates a request to open a sideband channel in the satellite communications link.

6. The system of claim 1, wherein the network load manager includes;
a data traffic monitor in communication with the onboard network firewall and receptive to current data traffic status messages therefrom;
a regulator engine receptive to the current data traffic status messages; and
a set of rules corresponding to the access grant conditions;
wherein the regulator engine processes the set of rules with the current data traffic status messages, in response to which the connection authorization is selectively generated.

7. The system of claim 6, wherein the network load manager further includes:
a historical network usage database with historical network usage data stored thereon;
wherein the regulator engine processes the set of rules with the current data traffic status messages and the historical network usage data, in response to which the connection authorization is selectively generated.

8. The system of claim 6, wherein the network load manager further includes:
a site list of ordered remote network nodes prioritized according to impacts to network capacity;
wherein the regulator engine processes the set of rules with the current data traffic status messages and the site list, in response to which the connection authorization is selectively generated.

9. The system of claim 1, further comprising:
an in-flight entertainment (IFE) system terminal in communication with the client application interface; and
an application installed on the IFE system terminal that is operable to communicate with the remote application service.

10. The system of claim 1, further comprising:
an aft crew messaging server in communication with the remote connectivity manager;
wherein the presence state includes one or more cabin crew messages that are relayed from the remote connectivity manager to the air crew messaging server upon receipt of the presence state.

11. A connectivity manager in communication with a network access controller to remotely, from a remote connectivity manager, permit data traffic between a client node and an upstream network, the connectivity manager comprising:
a processor; and
a memory storing instructions executed by the processor to implement software components including:
a network access control interface in communication with the network access controller, to which the client node is connected, the data traffic originating from the client node to the upstream network, and destined to the client node from the upstream network being selectively passed through the network access controller as at least partially designated via a gateway authorization provided to the network access control interface;
a client node presence manager in communication with the network access control interface and the remote connectivity manager, the client node presence manager maintaining a presence state of the client node, and
a network load manager in communication with the network access control interface and the client presence manager, the network bad manager generating the gateway authorization to the network access control interface in response to receipt of a connection authorization request and an evaluation of one or more access grant conditions, the connection authorization request being received from the remote connectivity manager in advance of any data link requests from client nodes and being based upon an evaluation of flight details of the aircraft against one or more conditions set by the remote application service;
wherein the remote connectivity manager is connected to a remote application service that dynamically defines one or more conditions relating to the presence state of the client node for the evaluation of the connection authorization request by the remote connectivity manager;
wherein the client node presence manager is connected to a client node application that requests a data communications link to the upstream network.

12. The connectivity manager of claim 11, wherein the upstream network is a satellite communications-based Internet connection.

13. The connectivity manager of claim 11, wherein the network load manager includes:
a data traffic monitor in communication with the network access control interface and receptive to current data traffic status messages therefrom;
a regulator engine receptive to the current data traffic status messages; and
a set of rules corresponding to the access grant conditions;
wherein the regulator engine processes the set of rules with the current data traffic status messages, in response to which the gateway authorization is generated.

14. The connectivity manager of claim 13, wherein the network load manager further includes:
a historical network usage database with historical network usage data stored thereon;
wherein the regulator engine processes the set of rules with the current data traffic status messages and the historical network usage data, in response to which the gateway authorization is generated.

15. The connectivity manager of claim 13, wherein the network load manager further includes:
a site list of ordered remote network nodes prioritized according to impacts to network capacity;
wherein the regulator engine processes the set of rules with the current data traffic status messages and the site list, in response to which the gateway authorization is generated.

16. A system for dynamically implementing exceptions in an onboard network firewall for one or more client devices on a data communications network aboard an aircraft to connect to a remote network node as authorized by a remote application service over a satellite communications link, the system comprising:
a client application interface receptive to a data link request from the one or more client devices;
an onboard connectivity manager including:
a processor; and
a memory storing instructions executed by the processor to implement software components including:
a firewall interface connected to the onboard network firewall to request the exceptions in response to a connection authorization; and
a client presence manager receptive to the data link request relayed by the client application interface from the one or more client devices, a presence state for the one or more client devices being activated and maintained following the data link request; and a remote connectivity manager connected to the remote application service and in communication with the onboard connectivity manager;

wherein the remote connectivity manager generates the connection authorization based upon an evaluation of flight details of the aircraft against one or more conditions set by the remote application service, the connection authorization request being generated in advance of any data link requests from the one or more client devices, the connection authorization request including a node identification corresponding to the remote network node with which a particular one of the one or more client devices is permitted to communicate over the satellite communications link;

wherein the system further comprises an application installed on the client device that is operable to communicate with the remote application service, the node identification being specific to the application.

* * * * *